(12) United States Patent
Jennings et al.

(10) Patent No.: US 10,907,479 B2
(45) Date of Patent: Feb. 2, 2021

(54) AIRFOIL HAVING IMPROVED LEADING EDGE COOLING SCHEME AND DAMAGE RESISTANCE

(71) Applicant: United Technologies Corporation, Farmington, CT (US)

(72) Inventors: Timothy J. Jennings, West Hartford, CT (US); Tracy A. Propheter-Hinckley, Rocky Hill, CT (US); Kyle C. Lana, Portland, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 148 days.

(21) Appl. No.: 15/972,429

(22) Filed: May 7, 2018

(65) Prior Publication Data

US 2019/0338648 A1 Nov. 7, 2019

(51) Int. Cl.
*F01D 5/18* (2006.01)
*F01D 9/04* (2006.01)
*F01D 25/12* (2006.01)

(52) U.S. Cl.
CPC .............. *F01D 5/187* (2013.01); *F01D 9/041* (2013.01); *F01D 25/12* (2013.01);
(Continued)

(58) Field of Classification Search
CPC .......... F01D 5/187; F01D 9/041; F01D 25/12; F05D 25/12; F05D 2220/32;
(Continued)

(56) References Cited

U.S. PATENT DOCUMENTS 6,974,308 B2 12/2005 Halfmann et al.
7,011,502 B2 * 3/2006 Lee .................. F01D 5/187
416/97 R (Continued)

FOREIGN PATENT DOCUMENTS

EP 1496204 A1 1/2005
EP 2940248 A1 11/2015
WO 2014130244 A1 8/2014

OTHER PUBLICATIONS

European Search Report for European Application No. 19172133.1, International Filing Date May 1, 2019, dated Aug. 28, 2019, 11 pages.

*Primary Examiner* — Courtney D Heinle
*Assistant Examiner* — Eric J Zamora Alvarez
(74) *Attorney, Agent, or Firm* — Cantor Colburn LLP (57) ABSTRACT

Airfoils for gas turbine engines are provided. The airfoils include an airfoil body extending between a leading edge and a trailing edge in an axial direction, between a pressure side and a suction side in a circumferential direction, and between a root and a tip in a radial direction, a first transitioning leading edge cavity located proximate the leading edge proximate the root of the airfoil body and transitioning axially toward the trailing edge as the first transitioning leading edge cavity extends radially toward the tip, and a second transitioning leading edge cavity located aft of the first transitioning leading edge cavity proximate the root of the airfoil body and transitioning axially toward the leading edge as the second transitioning leading edge cavity extends radially toward the tip. The second transitioning leading edge cavity includes an impingement sub-cavity and a film sub-cavity along the leading edge and proximate the tip.

17 Claims, 7 Drawing Sheets

(52) U.S. Cl.
CPC .... *F05D 2220/32* (2013.01); *F05D 2240/121* (2013.01); *F05D 2240/303* (2013.01); *F05D 2260/201* (2013.01); *F05D 2260/202* (2013.01)

(58) Field of Classification Search
CPC .......... F05D 2240/121; F05D 2240/303; F05D 2260/201; F05D 2260/202
See application file for complete search history.

(56) References Cited

U.S. PATENT DOCUMENTS

| | | | |
|---|---|---|---|
| 7,137,779 B2* | 11/2006 | Liang | F01D 5/187 |
| | | | 416/1 |
| 7,217,094 B2 | 5/2007 | Cunha et al. | |
| 7,837,441 B2 | 11/2010 | Spangler et al. | |
| 8,414,263 B1 | 4/2013 | Liang | |
| 8,858,176 B1 | 10/2014 | Liang | |
| 9,296,039 B2 | 3/2016 | Propheter-Hinckley et al. | |
| 9,506,347 B2* | 11/2016 | Key | F01D 5/141 |
| 2016/0017719 A1 | 1/2016 | Propheter-Hinckley et al. | |
| 2016/0024938 A1 | 1/2016 | Slavens et al. | |
| 2016/0230596 A1 | 8/2016 | Hagan et al. | |
| 2016/0273365 A1 | 9/2016 | Slavens et al. | |
| 2016/0326909 A1* | 11/2016 | Thistle | F01D 5/187 |
| 2017/0030199 A1 | 2/2017 | Barker et al. | |
| 2017/0183969 A1 | 6/2017 | Dujol et al. | |
| 2017/0268345 A1* | 9/2017 | Groves, II | F01D 5/187 |

* cited by examiner

AIRFOIL HAVING IMPROVED LEADING EDGE COOLING SCHEME AND DAMAGE RESISTANCE

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, improved cooling designs may be desirable.

BRIEF DESCRIPTION

According to some embodiments, airfoils for gas turbine engines are provided. The airfoils include an airfoil body extending between a leading edge and a trailing edge in an axial direction, between a pressure side and a suction side in a circumferential direction, and between a root and a tip in a radial direction, a first transitioning leading edge cavity located proximate the leading edge proximate the root of the airfoil body and transitioning axially toward the trailing edge as the first transitioning leading edge cavity extends radially toward the tip, and a second transitioning leading edge cavity located aft of the first transitioning leading edge cavity proximate the root of the airfoil body and transitioning axially toward the leading edge as the second transitioning leading edge cavity extends radially toward the tip. The second transitioning leading edge cavity includes an impingement sub-cavity and a film sub-cavity along the leading edge and proximate the tip.

In addition to one or more of the features described above, or as an alternative, further embodiments of the airfoils may include at least one impingement hole fluidly connecting the impingement sub-cavity to the film sub-cavity.

In addition to one or more of the features described above, or as an alternative, further embodiments of the airfoils may include at least one film hole formed in the airfoil body on the leading edge and fluidly connecting the film sub-cavity to an exterior of the airfoil body.

In addition to one or more of the features described above, or as an alternative, further embodiments of the airfoils may include that the first transitioning leading edge cavity comprises a pressure side sub-cavity proximate the tip and a suction side sub-cavity proximate the tip.

In addition to one or more of the features described above, or as an alternative, further embodiments of the airfoils may include at least one main body cavity located aft of the first and second transitioning leading edge cavities.

In addition to one or more of the features described above, or as an alternative, further embodiments of the airfoils may include that the airfoil body has a first thickness along the leading edge proximate the root and a second thickness along the leading edge proximate the tip, wherein the first thickness is different from the second thickness.

In addition to one or more of the features described above, or as an alternative, further embodiments of the airfoils may include that the first thickness is less than the second thickness.

In addition to one or more of the features described above, or as an alternative, further embodiments of the airfoils may include that the first thickness is between 0.020" and 0.045", and the second thickness is between 0.045" and 0.070".

According to some embodiments, core assemblies for forming airfoils of gas turbine engines are provided. The core assemblies include a first transitioning leading edge cavity core positioned to form a leading edge of a formed airfoil proximate a root of the formed airfoil, the first transitioning leading edge cavity core transitions axially aftward trailing edge as the first transitioning leading edge cavity extends radially toward a tip of the formed airfoil and a second transitioning leading edge cavity core positioned adjacent the first transitioning leading edge cavity core when arranged to form the airfoil, wherein the second transitioning leading edge cavity core is aft of the first transitioning leading edge cavity core proximate the root of the formed airfoil and transitions axially toward the leading edge of the formed airfoil as the second transitioning leading edge cavity core extends radially toward the tip of the formed airfoil. The second transitioning leading edge cavity core comprises an impingement cavity sub-core and a film cavity sub-core along the leading edge and proximate the tip of the formed airfoil.

In addition to one or more of the features described above, or as an alternative, further embodiments of the core assemblies may include at least one feature to form an impingement hole to fluidly connect a formed impingement sub-cavity and a formed film sub-cavity.

In addition to one or more of the features described above, or as an alternative, further embodiments of the core assemblies may include that the first transitioning leading edge cavity core comprises a pressure side cavity sub-core proximate the tip of the formed airfoil and a suction side cavity sub-core proximate the tip of the formed airfoil.

In addition to one or more of the features described above, or as an alternative, further embodiments of the core assemblies may include at least one main body cavity core located aft of the first and second transitioning leading edge cavity cores.

According to some embodiments, gas turbine engines are provided. The gas turbine engines include a turbine section having a plurality of airfoils. At least one airfoil includes an airfoil body extending between a leading edge and a trailing edge in an axial direction, between a pressure side and a suction side in a circumferential direction, and between a root and a tip in a radial direction, a first transitioning leading edge cavity located proximate the leading edge proximate the root of the airfoil body and transitioning axially toward the trailing edge as the first transitioning leading edge cavity extends radially toward the tip, and a second transitioning leading edge cavity located aft of the first transitioning leading edge cavity proximate the root of the airfoil body and transitioning axially toward the leading edge as the second transitioning leading edge cavity extends radially toward the tip. The second transitioning leading edge cavity comprises an impingement sub-cavity and a film sub-cavity along the leading edge and proximate the tip.

In addition to one or more of the features described above, or as an alternative, further embodiments of the gas turbine engines may include at least one impingement hole fluidly connecting the impingement sub-cavity to the film sub-cavity.

In addition to one or more of the features described above, or as an alternative, further embodiments of the gas turbine engines may include at least one film hole formed in the airfoil body on the leading edge and fluidly connecting the film sub-cavity to an exterior of the airfoil body.

In addition to one or more of the features described above, or as an alternative, further embodiments of the gas turbine engines may include that the first transitioning leading edge cavity comprises a pressure side sub-cavity proximate the tip and a suction side sub-cavity proximate the tip.

In addition to one or more of the features described above, or as an alternative, further embodiments of the gas turbine engines may include at least one main body cavity located aft of the first and second transitioning leading edge cavities.

In addition to one or more of the features described above, or as an alternative, further embodiments of the gas turbine engines may include that the airfoil body has a first thickness along the leading edge proximate the root and a second thickness along the leading edge proximate the tip, wherein the first thickness is different from the second thickness.

In addition to one or more of the features described above, or as an alternative, further embodiments of the gas turbine engines may include that the first thickness is less than the second thickness.

In addition to one or more of the features described above, or as an alternative, further embodiments of the gas turbine engines may include that the first thickness is between 0.020" and 0.045", and the second thickness is between 0.045" and 0.070".

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
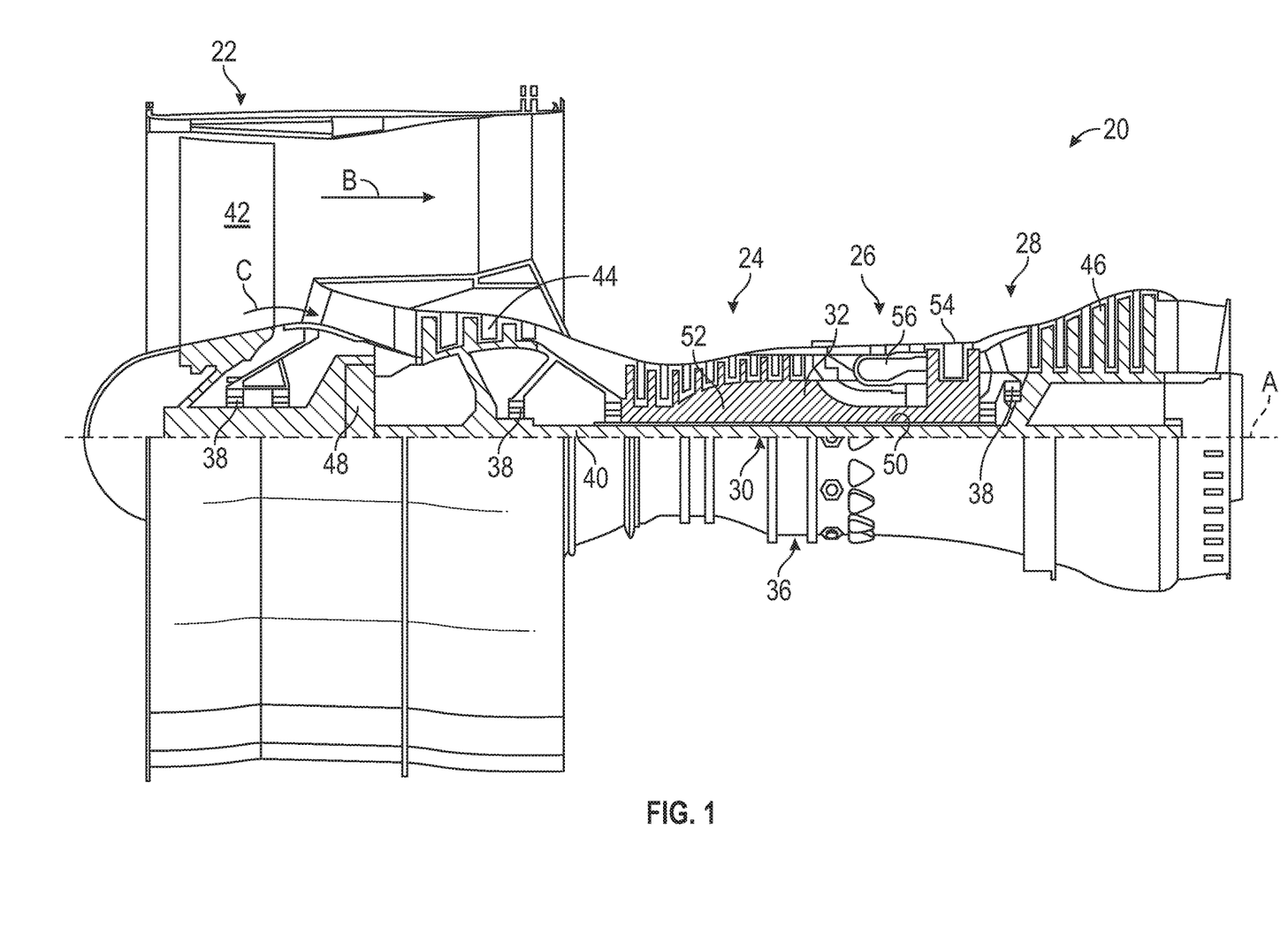
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
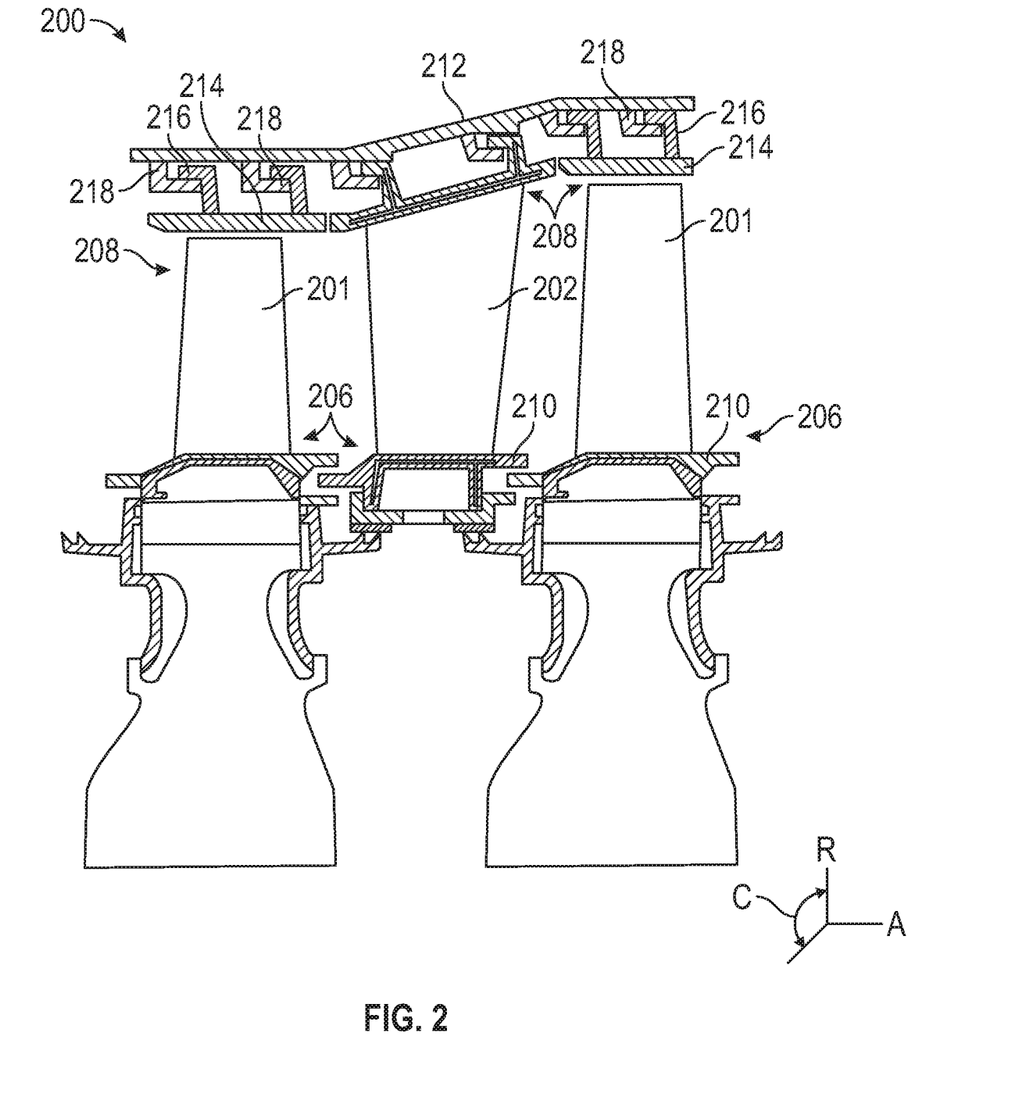
FIG. 2 is a schematic illustration of a portion of a turbine section of the gas turbine engine of FIG. 1.

FIG. 2 is a schematic view of a turbine section that may employ various embodiments disclosed herein. Turbine 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions or internal walls or structures within the airfoils 201, 202 that may extend either from the inner diameter 206 or the outer diameter 208 of the airfoil 201, 202, or as partial sections therebetween. The partitions may extend for a portion of the length of the airfoil 201, 202, but may stop or end prior to forming a complete wall within the airfoil 201, 202. Multiple of the airfoil cavities may be fluidly connected and form a fluid path within the respective airfoil 201, 202. The blades 201 and the vanes 202, as shown, are airfoils that extend from platforms 210 located proximal to the inner diameter thereof. Located below the platforms 210 may be airflow ports and/or bleed orifices that enable air to bleed from the internal cavities of the airfoils 201, 202. A root of the airfoil may connect to or be part of the platform 210. Such roots may enable connection to a turbine disc, as will be appreciated by those of skill in the art.

The turbine 200 is housed within a case 212, which may have multiple parts (e.g., turbine case, diffuser case, etc.). In various locations, components, such as seals, may be positioned between the airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Typically, airfoil cooling includes impingement cavities for cooling various hot surfaces of the airfoils. For example, it may be desirable to position a leading edge impingement cavity immediately adjacent to the external leading edge of the airfoil (e.g., left side edge of the airfoils 201, 202). The leading edge impingement cavity is typically supplied cooling airflow from impingement apertures which serve as conduits for cooling air that originates within the leading edge cooling cavities of the airfoil. Once in the leading edge impingement cavity, the cooling air flow is expelled through an array of shower head holes, thus providing increased convective cooling and a protective film to mitigate the locally high external heat flux along the leading edge airfoil surface.

Traditionally, investment casting manufacturing processes utilize hard tooling "core dies" to create both external airfoil and internal cooling geometries. In order to fabricate internal cooling geometries, it is required that the definition of the features be created in the same relative orientation (approximately parallel) to the "pull" direction of the core die tooling. As a result, the orientation and location of any internal cooling features is limited by virtue of core tooling/core die manufacturing processes used for investment casting of turbine airfoils. Further, various cooling feature may require drilling through the external walls or surfaces of the airfoil to fluidly connect to internal cavities thereof (e.g., to form film cooling holes). The orientation of the local internal rib geometry and positioning of the impingement cooling apertures is necessary to ensure optimal internal convective heat transfer characteristics are achieved to mitigate high external heat flux regions.

Figure 3A:
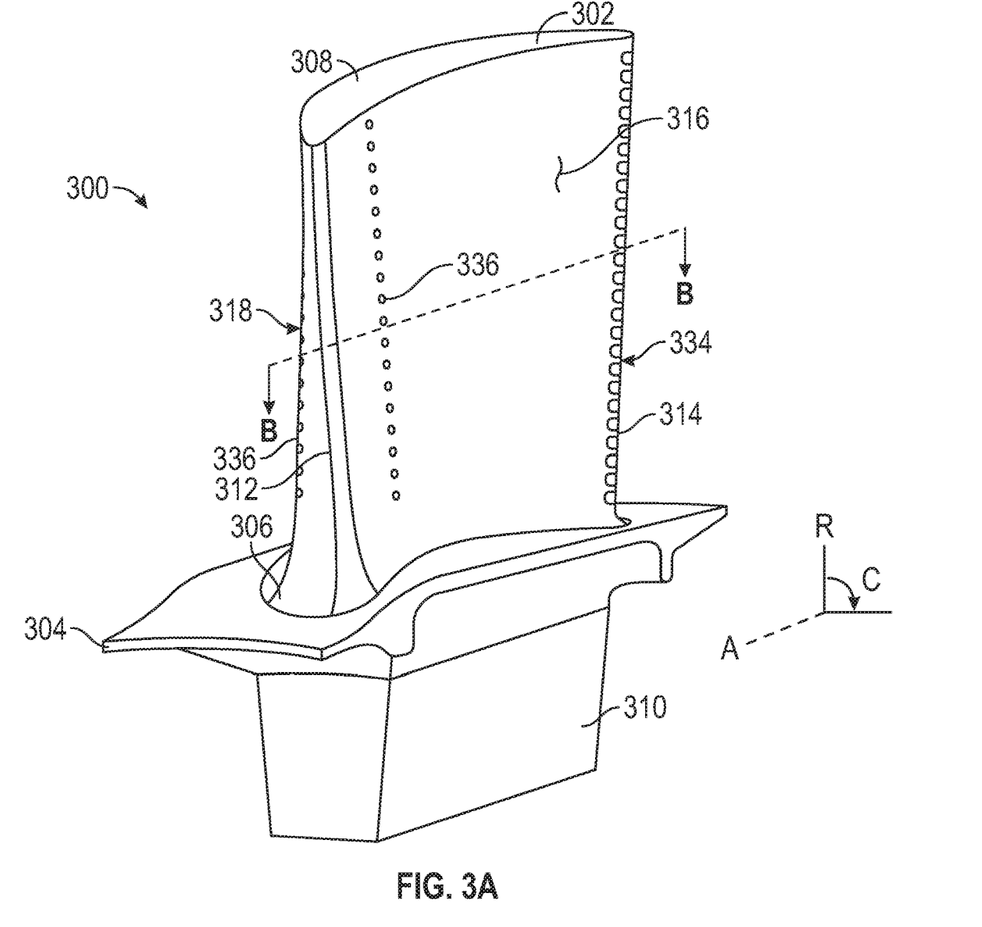
FIG. 3A is a perspective view of an airfoil that can incorporate embodiments of the present disclosure.
Figure 3B:
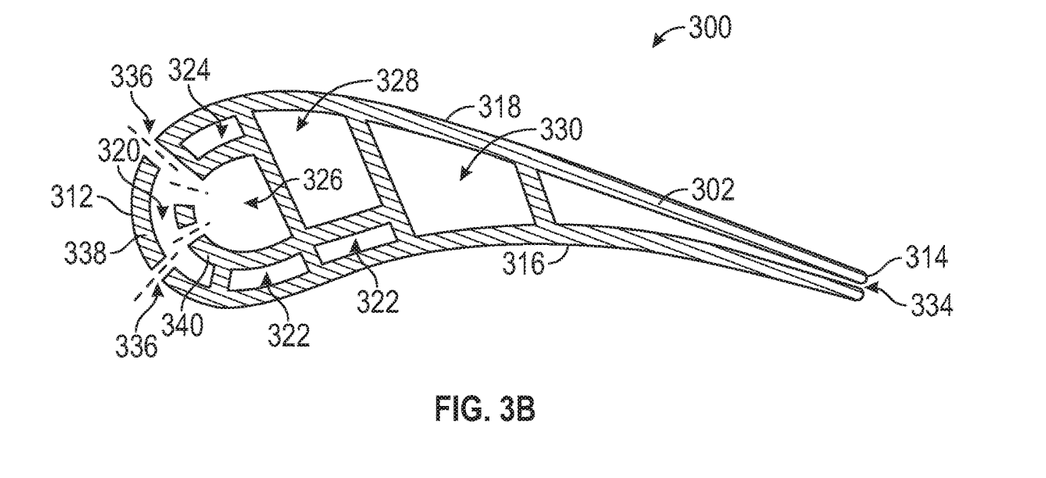
FIG. 3B is a partial cross-sectional view of the airfoil of FIG. 3A as viewed along the line B-B shown in FIG. 3A.

For example, turning now to FIGS. 3A-3B, schematic illustrations of an airfoil 300 are shown. FIG. 3A is an isometric illustration of the airfoil 300. FIG. 3B is a cross-sectional illustration of the airfoil 300 as viewed along the line B-B shown in FIG. 3A. The airfoil 300, as shown, is arranged as a blade having an airfoil body 302 that extends from a platform 304 from a root 306 to a tip 308. The platform 304 may be integrally formed with or attached to an attachment element 310, the attachment element 310 being configured to attach to or engage with a rotor disc for installation of the airfoil body 302 thereto. The airfoil body 302 extends in an axial direction A from a leading edge 312 to a trailing edge 314, and in a radial direction R from the root 306 to the tip 308. In the circumferential direction C, the airfoil body 302 extends between a pressure side 316 and a suction side 318.

As shown in FIG. 3B, illustrating a cross-sectional view of the airfoil 300, as viewed along the line B-B shown in FIG. 3A, the airfoil body 302 defines or includes a plurality of internal cavities to enable cooling of the airfoil 300. For example, as shown, the airfoil 300 includes a plurality of forward and side cooling cavities 320, 322, 324. A leading edge cavity 320 is located along the leading edge 312 of the airfoil body 302, pressure side cavities 322 are arranged along the pressure side 316 and proximate the leading edge 312, and a suction side cavity 324 is arranged along the suction side 318 and proximate the leading edge 312. In the relative middle of the airfoil body 302, the airfoil 300 includes various main body cavities 326, 328, 330, 332 and, at the trailing edge 314, a trailing edge slot 334. Some of the main body cavities may form a serpentine flow path through the airfoil 300, (e.g., cavities 328, 330, 332). Further, one or more of the main body cavities may be arranged to provide cool impinging air into the forward and side cooling cavities 320, 322, 324 (e.g., cavity 326). In some embodiments described herein, the cavity 326 may be referred to as a leading edge feed cavity. Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

Air that impinges into the leading edge cavity 320 (or other forward and side cooling cavities 320, 322, 324) may be expunged onto a hot external surface of the airfoil 300 through one or more film cooling holes 336. With reference to FIG. 3B, skin core cavities are defined between an external hot wall 338 and an internal cold wall 340 of the airfoil body 302. In accordance with embodiments of the present disclosure, the skin core cavities may have very thin heights, e.g., on the order of about 0.015 to 0.050 inches, with the height being a distance between a hot wall and a cold wall. Cool air from the leading edge feed cavity 326 may pass through impingement holes in the internal cold wall 340 to impinge upon the external hot wall 338, with the air subsequently flowing out through the film cooling holes 336.

The skin core cavities described above may be very efficient at cooling the hot wall of the airfoil, but this efficiency may degrade as the hot wall thickness increases. Accordingly, to maintain improved cooling, thin airfoil exterior walls may be preferable. However, other considerations may require increased thickness external walls of the airfoil. For example, one region of an airfoil that may require an increased external wall thickness is the leading edge of the airfoil where the part must be designed to withstand foreign object damage "FOD" (e.g., debris passing through the hot gas path and contacting and/or impacting the leading edge of the airfoil). To take advantage of skin core cavity cooling and also being able to withstand FOD, embodiments of present disclosure are directed to airfoils and cores for making the same that incorporate a modified cooling scheme that has a transition from a skin core cavity to an impingement cavity configuration. This transition can be employed, in some embodiments, toward an outer diameter or outer span of the airfoil. Further, the impingement cavity configuration may incorporate film cooling at the outer spans. Accordingly, a more robust airfoil design can be achieved as compared to just impingement cooling or just skin core cooling.

Figure 4A:
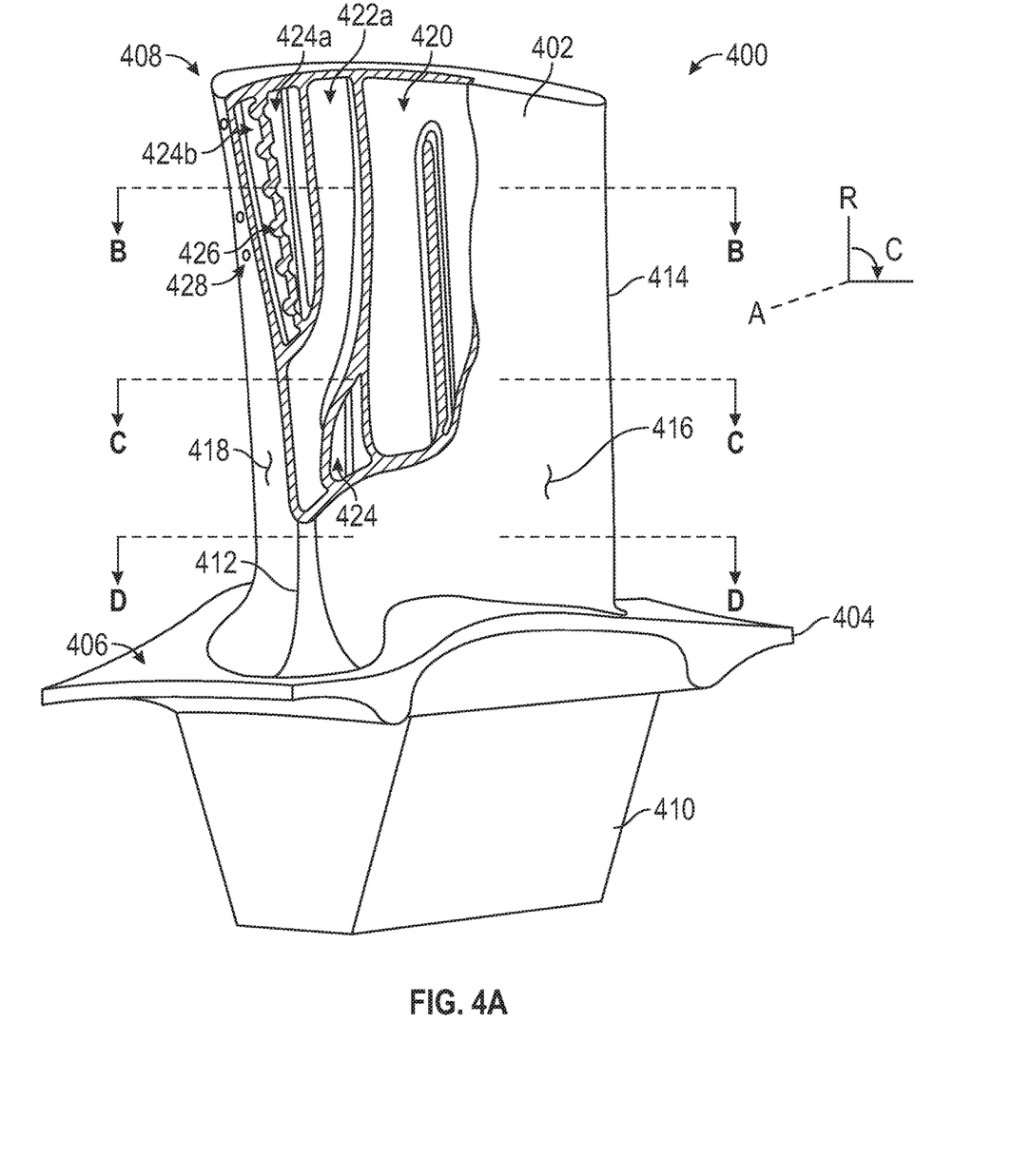
FIG. 4A is a schematic isometric illustration of an airfoil in accordance with an embodiment of the present disclosure.
Figure 4B:
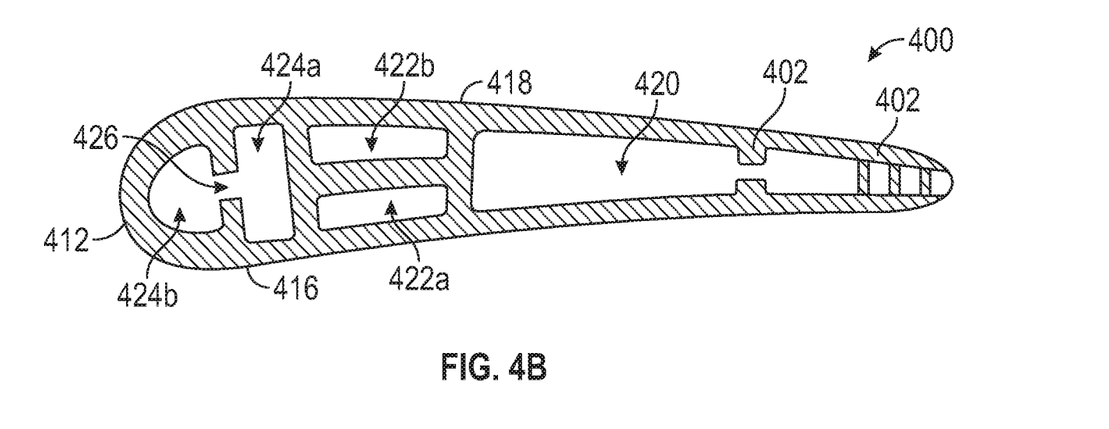
FIG. 4B is a cross-sectional illustration of the airfoil of FIG. 4A as viewed along the line B-B shown in FIG. 4A.
Figure 4C:
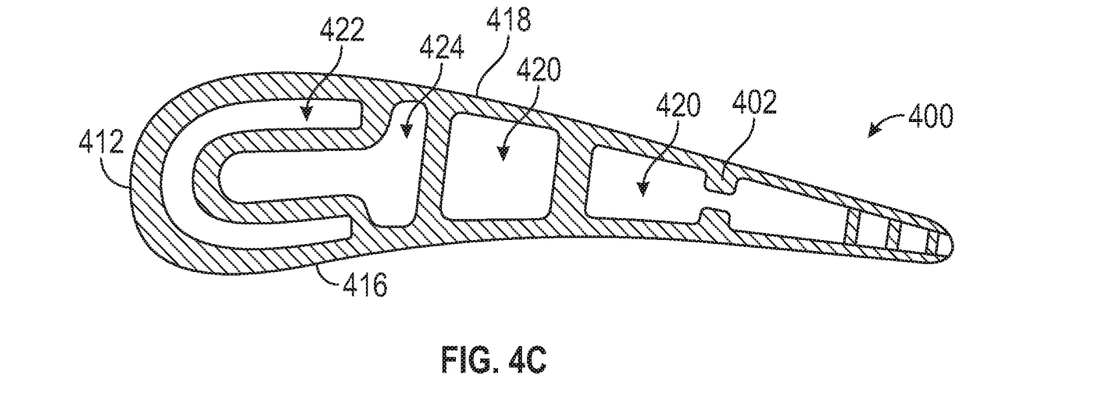
FIG. 4C is a cross-sectional illustration of the airfoil FIG. 4A as viewed along the line C-C shown in FIG. 4A.
Figure 4D:
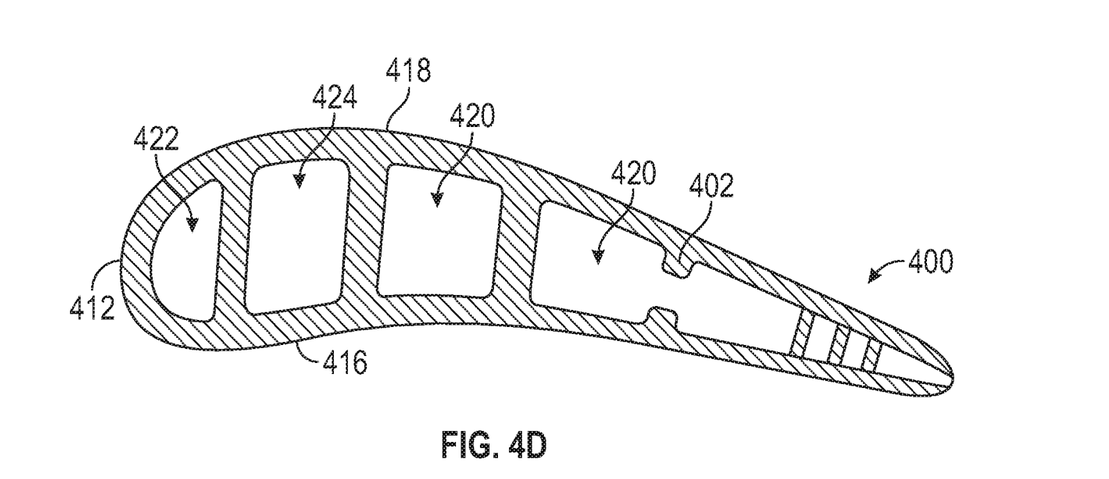
FIG. 4D is a cross-sectional illustration of the airfoil of FIG. 4A as viewed along the line D-D shown in FIG. 4A.

Turning now to FIGS. 4A-4D, schematic illustrations of an airfoil 400 in accordance with an embodiment of the present disclosure are shown. FIG. 4A is an isometric illustration of the airfoil 400. FIG. 4B is a cross-sectional illustration of the airfoil 400 as viewed along the line B-B shown in FIG. 4A. FIG. 4C is a cross-sectional illustration of the airfoil 400 as viewed along the line C-C shown in FIG. 4A. FIG. 4D is a cross-sectional illustration of the airfoil 400 as viewed along the line D-D shown in FIG. 4A.

The airfoil 400, as shown, is arranged as a blade having an airfoil body 402 that extends from a platform 404. The airfoil body 402 attaches to or is connected to the platform 404 at a root 406 (i.e., inner diameter) and extends radially outward to a tip 408 (i.e., outer diameter). The platform 404 may be integrally formed with or attached to an attachment element 410 and/or the airfoil body 402, the attachment element 410 being configured to attach to or engage with a rotor disc for installation of the airfoil 400 to the rotor disc. The airfoil body 402 extends in an axial direction A from a leading edge 412 to a trailing edge 414, and in a radial direction R from the root 406 to the tip 408. In the circumferential direction C, the airfoil body 402 extends between a pressure side 416 and a suction side 418.

The airfoil body 402 defines a number of internal cooling cavities. For example, as shown in FIGS. 4A-4D, a main body cavity 420 is shown as a serpentine arranged and is arranged to cool portions of the airfoil body 402 aft of the leading edge 412. Forward of the main body cavity 420 is a cavity arrangement that is configured to provide improved cooling and FOD protection to the airfoil body 402. For example, as shown a first transitioning leading edge cavity 422 and a second transitioning leading edge cavity 424 are arranged within the airfoil body 402. The first transitioning leading edge cavity 422 begins at the root 406 and extends radially outward toward the tip 408, and transitions from being proximate the leading edge 412 (at the root 406) to being proximate one or both of the pressure and suctions sides 416, 418 of the airfoil body (at the tip 408). The second transitioning leading edge cavity 424 begins at the root 406 and extends radially outward toward the tip 408, and transitions from being proximate the one or both of the pressure and suctions sides 416, 418 of the airfoil body (at the root 406) to being proximate the leading edge 412 of the airfoil body (at the tip 408).

The first transitioning leading edge cavity 422 is positioned proximate the leading edge 414. Proximate the root 406, as shown in cross-section in FIG. 4D, the first transitioning leading edge cavity 422 may have a half-circle or "D" geometry. Further, at the root 406 the second transitioning leading edge cavity 424 is shown as a conventional cavity that spans the airfoil body 402 between the pressure side 416 and the suction side 418. The location of the second transitioning leading edge cavity 424 aft of the first transitioning leading edge cavity 422 at the root 406 will reduce the amount of heat pickup within the second transitioning leading edge cavity 424 at the root 406, thus keeping the temperature of the air within the second transitioning leading edge cavity 424 relatively cool as compared to the air within the first transitioning leading edge cavity 422 at the root 406.

As the first and second transitioning leading edge cavities 422, 424 extend radially outward toward the tip 408, the geometries of the first and second transitioning leading edge cavities 422, 424 changes. For example, as shown in FIG. 4C, around mid-radial span, the first transitioning leading edge cavity 422 has taken on a substantially "C" shape, with the first transitioning leading edge cavity 422 providing cooling along the leading edge 412 and both the pressure and suction sides 416, 418 of the airfoil body 402. As the first transitioning leading edge cavity 422 transitions, so does the second transitioning leading edge cavity 424. As shown in FIG. 4C, the second transitioning leading edge cavity 424 transitioned into a substantially internal cavity with only a portion of the second transitioning leading edge cavity 424 cooling the external walls (e.g., the pressure and/or suction sides 416, 418 of the airfoil body 402). It will be appreciated that in some embodiments, the second transitioning leading edge cavity 424 may transition entirely internally with no contact with external surfaces of the airfoil body 402. In such embodiments, the first transitioning leading edge cavity 422 may extend axially to abut a portion of a main body cavity 420.

Proximate the tip 408 of the airfoil body 402, the first and second transitioning leading edge cavities 422, 424 have switch relative axial orientation, with the first transitioning leading edge cavity 422 located aft of the second transitioning leading edge cavity 424. In this embodiment, as shown, both the first and second transitioning leading edge cavities 422, 424 transition into multiple sub-cavities proximate the tip 408. For example, as shown, the first transitioning leading edge cavity 422 divides into a pressure side sub-cavity 422a and a suction side sub-cavity 422b. Thus, the cooling air that originates at the root 406 within the first transitioning leading edge cavity 422 may provide pressure side 416 and suction side 418 cooling at the tip 408. Further, as shown, the second transitioning leading edge cavity 424 includes an impingement sub-cavity 424a and a film sub-cavity 424b.

In this embodiment, the cooling air sourced through the second transitioning leading edge cavity 424 at the root 406 may be transitioned to provide cooling air proximate the tip 408 along the leading edge 412. As shown, the impingement sub-cavity 424a is located aft or axially behind the film sub-cavity 424b. The impingement sub-cavity 424a is fluidly connected to the film sub-cavity 424b by one or more impingement holes 426. The impingement holes 426 may be the only source of air into the film sub-cavity 424b. Air within the film sub-cavity 424b may bleed out of the airfoil body 402 through one or more film holes 428 to form a cooling film on an exterior surface of the airfoil body 402.

In some embodiments, one or both of the transitioning leading edge cavities (or portions thereof) can include one or more heat transfer augmentation features. Heat transfer augmentation features can include, but are not limited to, turbulators, trip strips (including, but not limited to normal, skewed, segmented skewed, chevron, segmented chevron, W-shaped, and discrete W's), pin fins, hemispherical bumps and/or dimples, as well as non-hemispherical shaped bumps and/or dimples, etc.

Accordingly, in accordance with embodiments described herein, the inner diameter of the airfoil may be cooled by one or more cavities that may have little to no film cooling, which may increase cooling efficiency. At the inner diameter, e.g., proximate the root, there is little risk of impact damage at these spans and the heat load is generally controlled due to concern regarding a combination of high stress and temperature in the same region. However, at the outer diameter, e.g., proximate the tip, where the airfoil may be more likely to have a higher heat load and may have an elevated risk of impact damage, an impingement scheme with cooling air that has been shielded from heat pickup is used to provide an optimal balance of damage tolerance and cooling effectiveness. That is, in accordance with some embodiments of the present disclosure, a combination of traditional and skin core cooling cavities may be used to provide optimal cooling and damage protection. Such combination is achieved through the use of transitioning leading edge cavities, as described above.

In addition to providing a dual-cavity arrangement at the tip of the airfoil, embodiments provided herein can provide increased damage resistance. The dual-cavity arrangement shown in FIGS. 4A-4D provides for an improved robustness at the tip because of the dual cavities. For example, if an impact occurs at the location of the film sub-cavity, the material of the airfoil may be removed, thus exposing the film sub-cavity. However, the airfoil will not be substantially impacted because of the presence of the material separating the impingement sub-cavity from the film sub-cavity. In essence, if the wall of the airfoil is damaged sufficiently to expose the film cavity entirely (and thus eliminate it), the impingement sub-cavity will become a film cavity that can expel air into the gaspath, and thus continue to provide cooling to the airfoil, even after foreign object damage.

Additionally, embodiments provided herein may enable improved robustness while provide the cooling described herein (e.g., shifting of cooling air from the leading edge aftward and relatively cooler air forward to the leading edge). For example, turning to FIGS. 5A-5B, schematic cross-sections of an airfoil 530 in accordance with an embodiment of the present disclosure are shown. The airfoil 530 may include multiple internal cavities within an airfoil body 532, similar to that shown and described above.

Figure 5A:
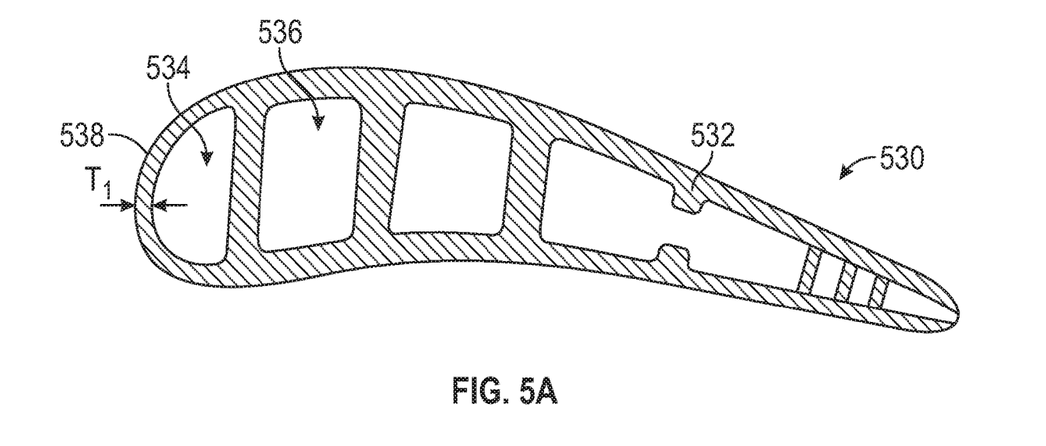
FIG. 5A is a schematic sectional illustration of an airfoil in accordance with an embodiment of the present disclosure as taken proximate the root of the airfoil.
Figure 5B:
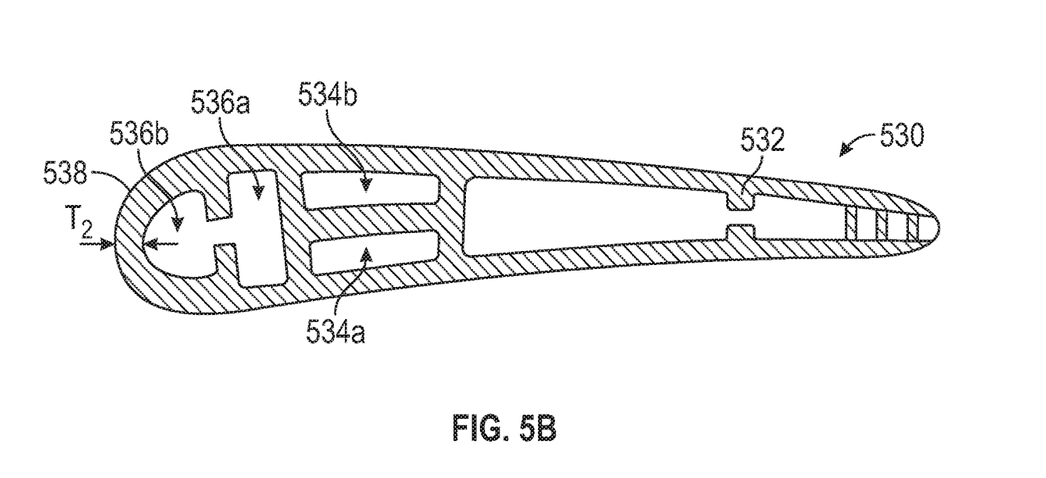
FIG. 5B is a schematic sectional illustration of the airfoil shown in FIG. 5A as taken proximate the tip of the airfoil.

As shown, the airfoil 530 has an airfoil body defining a first transitioning leading edge cavity 534 and a second transitioning leading edge cavity 536. The first transitioning leading edge cavity 534 is proximate to a leading edge 538 at the root of the airfoil body 530 (as shown in FIG. 5A) and transitions aftward toward the tip (as shown in FIG. 5B) to form sub-cavities 534a, 534b similar to that shown and described above. The second transitioning leading edge cavity 536 is located aft of the first transitioning leading edge cavity 534 proximate the root and transitions to proximate the leading edge 538 at the tip, and includes an impingement sub-cavity 536a and a film sub-cavity 536b similar to that shown and described above.

As shown in FIG. 5A, a first wall thickness $T_1$ of the airfoil body 532 at the root of the leading edge 538 may be relatively thin, which may be efficient to cool with cooling air passing through the first transitioning leading edge cavity 534. The thin first wall thickness $T_1$ is located at regions proximate the root and thus are not subject to a high risk of foreign object damage, and thus the preference for cooling efficiency may be provided. However, at the tip (FIG. 5B), a second wall thickness $T_2$ of the airfoil body is provided along the leading edge 538. The second wall thickness $T_2$ is larger than the first wall thickness $T_1$, and can provide additional structural robustness to withstand foreign object impacts that are more likely to impact the airfoil body 532 at the tip (FIG. 5B). The increased thickness of the airfoil body 532 along the second transitioning leading edge cavity 536 at the tip can be cooled using impingement cooling provided from the impingement sub-cavity 536a into the film sub-cavity 536b. The impinging air may then bleed to the external surface of the airfoil body 532 through the second wall thickness $T_2$ to form a cooling film on the external surface of the airfoil body 532. Accordingly, the combination of impingement cooling and film cooling at the tip of the airfoil may enable the inclusion of increased wall thickness at the tip of the leading edge. In some non-limiting embodiments, the first thickness may have a thickness between 0.020" and 0.045", and the second thickness may have a thickness between 0.045" and 0.070".

Figure 6:
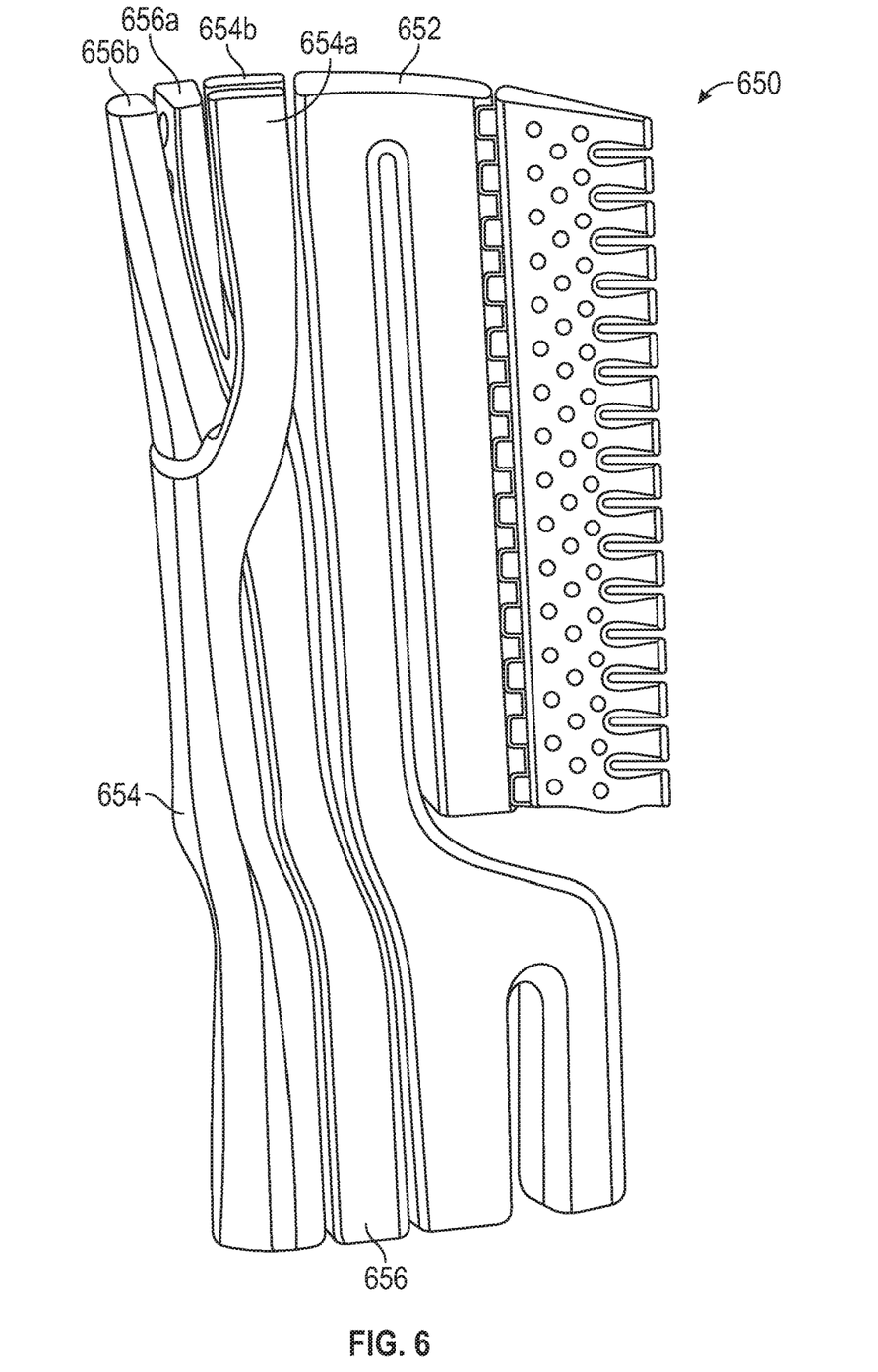
FIG. 6 is a schematic illustration of a core assembly for forming an airfoil in accordance with an embodiment of the present disclosure.

Turning now to FIG. 6, a schematic illustration of a core assembly 650 in accordance with an embodiment of the present disclosure is shown. The core assembly 650 may be used to form and manufacture airfoils in accordance with the present disclosure. The core assembly 650 includes a main body cavity core 652, a first transitioning leading edge cavity core 654, and a second transitioning leading edge cavity core 656. Although shown with a single or unitary main body cavity core 652, those of skill in the art will appreciate that the main body cavities may be formed by one or more cores having various arrangements and geometries, without departing from the scope of the present disclosure.

The first transitioning leading edge cavity core 654 is arranged at the leading edge of the formed airfoil and is arranged to form a cavity that starts at leading edge at the root of the formed airfoil, as shown and described above. The first transitioning leading edge cavity core 654 then transitions aftward, and in this case splits into a pressure side sub-core 654a and a suction side sub-core 654b. The second transitioning leading edge cavity core 656 is arranged aftward of the first transitioning leading edge cavity core 654 at the root of a formed airfoil, but will transition forward to the leading edge proximate the tip of the formed airfoil. The second transitioning leading edge cavity core 656 includes an impingement cavity sub-core 656a and a film cavity sub-core 656b, to form leading edge sub-cavities, as shown and described above. The second transitioning leading edge cavity core 656 can include one or more core elements to join the impingement cavity sub-core 656a and the film cavity sub-core 656b and to form one or more impingement holes therebetween in a formed airfoil, as shown and described above.

Advantageously, embodiments described herein can incorporate skin cavity/core (e.g., thin wall) cooling at various locations but may also include improved FOD protection where needed. Accordingly, embodiments provided herein can enable improved part life and thrust specific fuel consumption.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body extending between a leading edge and a trailing edge in an axial direction, between a pressure side and a suction side in a circumferential direction, and between a root and a tip in a radial direction;
    a first transitioning leading edge cavity located proximate the leading edge proximate the root of the airfoil body and transitioning axially toward the trailing edge as the first transitioning leading edge cavity extends radially toward the tip such that the first transitioning leading edge cavity transitions and divides from a single cavity proximate the root to two separate and divided sub-cavities defining a pressure side sub-cavity and a suction side sub-cavity proximate the tip; and
    a second transitioning leading edge cavity located aft of the first transitioning leading edge cavity proximate the root of the airfoil body and transitioning axially toward the leading edge as the second transitioning leading edge cavity extends radially toward the tip such that the second transitioning leading edge cavity transitions and divides from a single cavity proximate the root to two sub-cavities defining an impingement sub-cavity and a film sub-cavity proximate the tip.

2. The airfoil of claim 1, further comprising at least one impingement hole fluidly connecting the impingement sub-cavity to the film sub-cavity.

3. The airfoil of claim 1, further comprising at least one film hole formed in the airfoil body on the leading edge and fluidly connecting the film sub-cavity to an exterior of the airfoil body.

4. The airfoil of claim 1, further comprising at least one main body cavity located aft of the first and second transitioning leading edge cavities.

5. The airfoil of claim 1, wherein the airfoil body has a first thickness along the leading edge proximate the root and a second thickness along the leading edge proximate the tip, wherein the first thickness is different from the second thickness.

6. The airfoil of claim 5, wherein the first thickness is less than the second thickness.

7. The airfoil of claim 5, wherein the first thickness is between 0.020" and 0.045", and the second thickness is between 0.045" and 0.070".

8. A core assembly for forming an airfoil of a gas turbine engine, the core assembly comprising:
 a first transitioning leading edge cavity core positioned to form a leading edge of a formed airfoil proximate a root of the formed airfoil, the first transitioning leading edge cavity core transitions axially aftward trailing edge as the first transitioning leading edge cavity extends radially toward a tip of the formed airfoil such that the first transitioning leading edge cavity core transitions and divides from a single cavity core proximate the root to two separate and divided sub-cavity cores defining a pressure side sub-cavity core and a suction side sub-cavity core proximate the tip; and
 a second transitioning leading edge cavity core positioned adjacent the first transitioning leading edge cavity core when arranged to form the airfoil, wherein the second transitioning leading edge cavity core is aft of the first transitioning leading edge cavity core proximate the root of the formed airfoil and transitions axially toward the leading edge of the formed airfoil as the second transitioning leading edge cavity core extends radially toward the tip of the formed airfoil such that the second transitioning leading edge cavity core transitions and divides from a single cavity core proximate the root to two sub-cavity cores defining an impingement sub-cavity core and a film sub-cavity core proximate the tip.

9. The core assembly of claim 8, further comprising at least one feature to form an impingement hole to fluidly connect a formed impingement sub-cavity and a formed film sub-cavity.

10. The core assembly of claim 8, further comprising at least one main body cavity core located aft of the first and second transitioning leading edge cavity cores.

11. A gas turbine engine comprising:
 a turbine section having a plurality of airfoils, wherein at least one airfoil comprises:
  an airfoil body extending between a leading edge and a trailing edge in an axial direction, between a pressure side and a suction side in a circumferential direction, and between a root and a tip in a radial direction;
  a first transitioning leading edge cavity located proximate the leading edge proximate the root of the airfoil body and transitioning axially toward the trailing edge as the first transitioning leading edge cavity extends radially toward the tip such that the first transitioning leading edge cavity transitions and divides from a single cavity proximate the root to two separate and divided sub-cavities defining a pressure side sub-cavity and a suction side sub-cavity proximate the tip; and
  a second transitioning leading edge cavity located aft of the first transitioning leading edge cavity proximate the root of the airfoil body and transitioning axially toward the leading edge as the second transitioning leading edge cavity extends radially toward the tip such that the second transitioning leading edge cavity transitions and divides from a single cavity proximate the root to two sub-cavities defining an impingement sub-cavity and a film sub-cavity proximate the tip.

12. The gas turbine engine of claim 11, further comprising at least one impingement hole fluidly connecting the impingement sub-cavity to the film sub-cavity.

13. The gas turbine engine of claim 11, further comprising at least one film hole formed in the airfoil body on the leading edge and fluidly connecting the film sub-cavity to an exterior of the airfoil body.

14. The gas turbine engine of claim 11, further comprising at least one main body cavity located aft of the first and second transitioning leading edge cavities.

15. The gas turbine engine of claim 11, wherein the airfoil body has a first thickness along the leading edge proximate the root and a second thickness along the leading edge proximate the tip, wherein the first thickness is different from the second thickness.

16. The gas turbine engine of claim 15, wherein the first thickness is less than the second thickness.

17. The gas turbine engine of claim 15, wherein the first thickness is between 0.020" and 0.045", and the second thickness is between 0.045" and 0.070".

\* \* \* \* \*